United States Patent [19]

Kashino et al.

[11] Patent Number: 4,474,188
[45] Date of Patent: Oct. 2, 1984

[54] COMBINE

[75] Inventors: Shinzo Kashino; Ryuichi Minami; Junzo Sukenari, all of Sakai, Japan

[73] Assignee: Kubota, Ltd., Osaka, Japan

[21] Appl. No.: 488,705

[22] Filed: Apr. 26, 1983

[30] Foreign Application Priority Data

Nov. 15, 1982 [JP] Japan .................. 57-200163

[51] Int. Cl.³ .................. A01F 7/04; A01F 12/18
[52] U.S. Cl. .................. 130/27 H; 130/27 J; 56/14.6
[58] Field of Search .......... 56/14.6, DIG. 5; 130/27 F, 27 AB, 27 H, 27 J, 27 R, 27 P, 27 S

[56] References Cited

U.S. PATENT DOCUMENTS 3,630,209 12/1971 Metzger .................. 130/27 F

FOREIGN PATENT DOCUMENTS 1244460 7/1967 Fed. Rep. of Germany ....... 56/14.6
2056630 5/1971 Fed. Rep. of Germany ....... 56/14.6
1054897 1/1967 United Kingdom .............. 56/14.6

Primary Examiner—Gene Mancene
Assistant Examiner—John G. Weiss
Attorney, Agent, or Firm—Cushman, Darby and Cushman

[57] ABSTRACT

A combine equipped with a dispersing guide plate at the inner upper portion of a threading chamber. A tailings return port for returning tailings to the threshing chamber for second separation, is formed at the center of the inner upper surface of the threshing chamber where there is provided a space where a little amount of harvested grain stalks streams.

3 Claims, 3 Drawing Figures

COMBINE

BACKGROUND OF THE INVENTION (1) Field of the Invention

The present invention relates to a combine provided at the inner upper portion of a threshing chamber thereof with a dispersing guide plate for separating and dispersing grain stalks upwardly conveyed and guided to the rear wall of the threshing chamber from the lower rear portion of a threshing drum with the rotation thereof, in the direction from the central rear portion of the threshing chamber to the frontal lateral sides thereof, thus separated and dispersed grain stalks being then re-supplied from the frontal lower lateral sides of the threshing drum.

(2) Description of the Prior Art

A combine having a dispersing guide plate of the type above-mentioned has been recently developed by the inventors of the present invention and others. The provision of the dispersing guide plate causes grain stalks supplied into the threshing chamber to be conveyed as rotated by one or more revolutions around the axis of the threshing drum, thereby lengthening the treatment path. The plate also assures the separation of the grain conveyed as rotated by one revolution which is in the middle course of treatment, from untreated grain stalks supplied from the frontal center inlet. Such arrangement eliminates both excess treatment of grain stalks which are excessively rotated and conveyed in the threshing chamber, and insufficinet treatment of grain stalks which are discharged from the threshing chamber after merely conveyed a short distance along the lower peripheral wall of the threshing chamber without having been rotatingly conveyed therein. Thus, a combine of this type advantageously assures an efficient threshing with high capacity.

In treatment of return tailings to the threshing chamber for second separation, however, a combine of this type has the following disadvantages.

Like a conventional combine having no dispersing guide plate, such return of tailing is made along the entire width of the threshing chamber. Those portions of the tailings which have been returned to the lateral sides of the threshing chamber, are discharged therefrom as insufficiently treated while merely conveyed along the inner lower portions of the threshing chamber. This presents an increase in tailings and a loss in the grain discharged to the outside of the combine.

Furthermore, at the both lateral sides of the tailings return port, tailings are returned to those portions of threshing chamber where newly harvested grain stalks are rotatingly conveyed. Accordingly, these rotatingly conveyed grain stalks may close the tailings return port, or be caught in the tailings return port as if entered therein. This prevents not only a smooth and secure return of tailings into the threshing chamber, but also a rotating coveyance of newly harvested grain stalks. As consequence, the originally intended object of providing an efficient threshing by the provision of a dispersing guide plate, cannot be fully achieved.

SUMMARY OF THE INVENTION

It is an object of the present invention to provide a combine having a dispersing guide plate of the type above-mentioned which is efficiently utilized so as to efficiently perform a second separation of returned tailings in the threshing chamber.

The combine in accordance with the present invention is characterized in that a tailings return port is formed at the upper center portion in the threshing chamber, in view of the absence of grain stalks at the upper center portion in the threshing chamber due to the provision of a dispersing guide plate thereat.

Such arrangement of the tailings return port at the upper center portion in the threshing chamber, permits tailings to be supplied to that space of the threshing chamber where grain stalks are absent, upsteam in the rotation direction with respect to the frontal center inlet. Return of tailings into the threshing chamber can be therefore made in a smooth, secure and satisfactory manner without interference by newly harvested grain stalks subjected to rotating conveyance. At the same time, rotating conveyance of newly harvested grain stalks can also be made in a smooth, secure and satisfactory manner without disturbance by the tailings return port.

Furthermore, returned tailings for second separation can be treated alone before they reach the frontal center inlet. After having reached the frontal center inlet, the returned tailings can be treated in one revolution in a sufficiently long treatment path, likewise newly harvested grain stalks supplied from the frontal center inlet. As a whole, the treatment path for the returned tailings can be lengthed, thus enabling the returned tailings to be subjected to second separation in a sufficient, secure and satisfactory manner in the threshing chamber.

As thus discussed, the combine in accordance with the present invention permits returned tailings to be treated in a secure, satisfactory and efficient manner in the threshing chamber while maintaining the predetermined threshing function obtained by the provision of the dispersing guide plate.

DESCRIPTION OF THE PREFERRED EMBODIMENT

Figure 1:
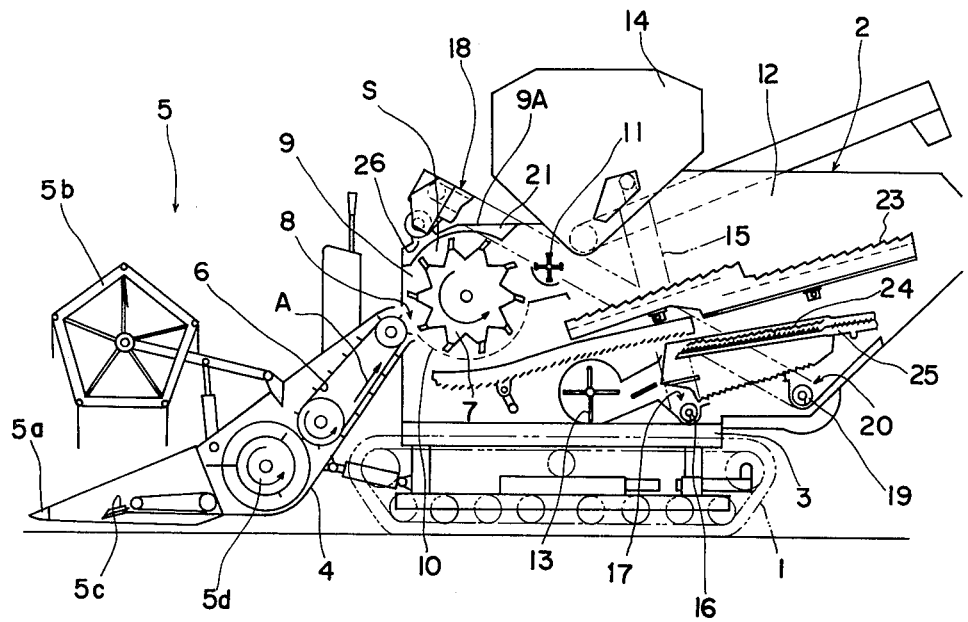
FIG. 1 is a longitudinal section view in side elevation of a combine in accordance with the present invention.

FIG. 1 illustrates a combine comprising a crawler travelling device 1, a main body frame 3 equipped with a thresher 2, a frame 4 connected to the front of the main body frame 3, a harvester 5 attached to the frame 4, and a conveyor 6 also attached to the frame 4 for forming a delivery path A along which grain stalks harvested by the harvester 5 are conveyed and supplied to the thresher 2.

The harvester 5 has a stalk dividing means 5a, pulling-up reel 5b, a harvesting blade 5c and an auger 5d for centralizing harvested grain stalks.

The thresher 2 has a threshing chamber 9 in which harvested grain stalks introduced and supplied from a transverse central inlet 8 at the front of a threshing drum 7 to the lower portion of the threshing drum 7 through the conveyor 6, are guided to the upper portion of the threshing chamber 9 by a rear wall 9', a corn cape 10 for conveying rearwardly the threshed grain falling from the threshing chamber 9, a beater 11 for rearwardly conveying chaff and other material rearwardly discharged from the threshing chamber, a selecting chamber 12 for selecting treated articles supplied through the corn cape 10 and the beater 11, a blower 13 for generating a selecting air current, a clean grain collecting means 7 having a screw 16 for conveying and supplying the clean grain to a lifting conveyor 15 connected to a tank 14, and a tailings collecting means 20 having a screw 19 for conveying and supplying tailings to a return conveyor 18 leading to the threshing chamber 9.

The threshing chamber 9 is provided at the inner upper surface 9A thereof with a dispersing guide plate 21 for separating and dispersing grain stalks which have been guided from the lower rear portion of the threshing drum 7 to the rear wall 9' with the rotation of the threshing drum 7, in the direction from the central rear portion of the threshing chamber 9 to the frontal lateral sides thereof in the axial direction of the threshing drum 7, thus separated and dispersed grain stalks then re-supplied from the frontal lower portions of the both lateral sides of the threshing drum 7. This dispersing guide plate 21 has a V-shape section in plan elevation and forms, at the upper portion of the threshing chamber 9, a space S expanding in the axial direction of the threshing drum 7.

The threshing chamber 9 is provided at the lateral sides of the inner rear portion thereof with dust discharging ports 22.

The selecting chamber 12 incorporates a straw walker 23, a chaff sieve 24 and a grain sieve 25.

Figure 2:
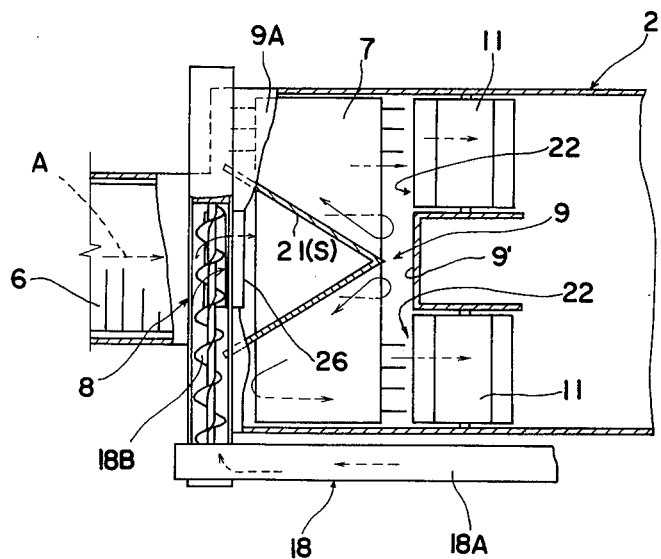
FIG. 2 is a section view in plan elevation of a threshing chamber of the combine in FIG. 1.
Figure 3:
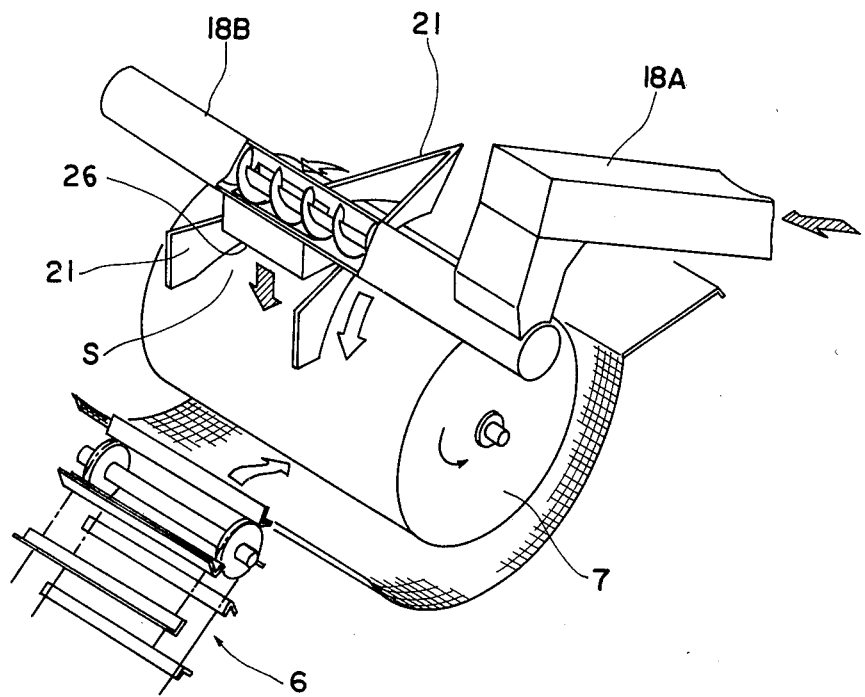
FIG. 3 is a perspective view of main portions of the present invention.

The return conveyor 18 has a lifting conveyor 18A and a transverse screw conveyor 18B, which has a tailings return port 26 located at the center portion of the inner upper surface 9A of the threshing chamber 9, as shown in FIGS. 1, 2 and 3.

According to such arrangement in the embodiment above-mentioned, grain stalks supplied from the frontal center inlet 8 are upwardly swivelled as guided by the rear wall 9' of the threshing chamber 9, and then dispersingly guided in the axial direction of the threshing drum 7 by the dispersing guide plate 21, while making one or more revolutions in the threshing chamber 9. The grain and other material are then discharged from the threshing chamber 9 and sorted into the clean grain and tailings. Tailings are returned for second separation from the return port 26 to the upper central portion of the threshing chamber 9 through the lifting conveyor 18A. At this time, the tailings are supplied to the space S defined by the dispersing guide plate 21 at the upper portion of the threshing chamber 9. It is therefore possible to join the tailings with grain stalks newly supplied from the center inlet 8, the thus mixed tailings and grain stalks being then treated while rotated by one revolution. In other words, if tailings are supplied to other places then the space S at the upper portion of the threshing chamber 9, e.g., to places adjacent the both ends of the threshing drum 7, the tailings cannot be sufficiently threshed, because they are supplied directly to the beater 11 without being swivelled when passing through the lower portion of the threshing drum 7.

Thus, the tailings supplied into the space S can be swivelled and conveyed together with newly harvested grain stalks supplied from the frontal center inlet 8, and then rearwardly discharged to the beater 11 after having been subjected to a sufficient threshing.

We claim:

1. A combine comprising:
    a threshing chamber;
    a threshing drum mounted for rotation in said chamber and having an inlet at the front and center of said drum to receive cut grain which is conveyed thereafter beneath said drum;
    a rear wall in said chamber defining a guide surface located at the center and rear of said drum for guiding cut grain stalks at the center of said drum upwardly;
    a V-shaped guide means formed of two diverging legs mounted above said drum for receiving and dispersing axially away from the drum center grain stalks guided upwardly by said rear wall;
    means adjacent said drum at the rear thereof for discharging chaff and tailings;
    means for conveying tailings to a tailing return port at the center of said drum and discharging the tailings onto said drum between said legs.

2. A combine as in claim 1 further including means for separating clean grain from said tailings and delivering said tailings to said conveying means.

3. A combine as in claim 2 wherein said conveying means includes a conveyor adjacent said chamber for conveying said tailings upwardly and a transverse screw conveyor for transporting said tailings from said conveyor to said tailing return port.

* * * * *